(12) United States Patent
Chiu et al.

(10) Patent No.: US 11,994,756 B2
(45) Date of Patent: May 28, 2024

(54) METHOD FOR MAKING A GRADIENT COLOR POLAR LENS WITH A NON-POLAR NEAR VISION ZONE

(71) Applicant: Essilor International, Charenton-le-Pont (FR)

(72) Inventors: Hao-Wen Chiu, Dallas, TX (US); Srinivasan Balasubramanian, Dallas, TX (US); Peiqi Jiang, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 771 days.

(21) Appl. No.: 16/973,939

(22) PCT Filed: Jun. 11, 2019

(86) PCT No.: PCT/EP2019/065138
§ 371 (c)(1),
(2) Date: Dec. 10, 2020

(87) PCT Pub. No.: WO2019/238637
PCT Pub. Date: Dec. 19, 2019

(65) Prior Publication Data
US 2021/0255487 A1 Aug. 19, 2021

(30) Foreign Application Priority Data

Jun. 12, 2018 (EP) .................... 18305720

(51) Int. Cl.
*G02C 7/12* (2006.01)
*B29D 11/00* (2006.01)
(Continued)

(52) U.S. Cl.
CPC .......... *G02C 7/12* (2013.01); *B29D 11/00009* (2013.01); *B29D 11/00644* (2013.01);
(Continued)

(58) Field of Classification Search
CPC .... G02C 7/12; G02C 7/105; B29D 11/00009; B29D 11/00644; B29D 11/00923;
(Continued)

(56) References Cited

U.S. PATENT DOCUMENTS 9,372,353 B2   6/2016  Trapani et al.
2015/0253465 A1   9/2015  Trapani et al.
(Continued)

FOREIGN PATENT DOCUMENTS

GB           488958        7/1938
WO        2017/074441      5/2017
WO      WO2017074441    *  5/2017   ............... G02B 5/30

OTHER PUBLICATIONS

International Search Report for PCT/EP2019/065138 dated Sep. 3, 2019, 3 pages.
(Continued)

*Primary Examiner* — James C. Jones
(74) *Attorney, Agent, or Firm* — NIXON & VANDERHYE

(57) ABSTRACT

Disclosed are methods for preparing partially polarized optical articles. A polarizing element is used to cover at least a portion of the front surface of an optical article to form a polarizing zone and a non-polarizing zone on the optical article. The optical article is then tinted to produce a gradual color transition between the polarizing zone and non-polarizing zone of the optical article.

12 Claims, 3 Drawing Sheets

(51) Int. Cl.
 *G02B 1/08* (2006.01)
 *G02B 5/30* (2006.01)
 *G02C 7/10* (2006.01)
(52) U.S. Cl.
 CPC .......... *B29D 11/00923* (2013.01); *G02B 1/08* (2013.01); *G02B 5/3033* (2013.01); *G02C 7/105* (2013.01)
(58) Field of Classification Search
 CPC .... B29D 11/0073; G02B 1/08; G02B 5/3033; G02B 5/22
 See application file for complete search history.

(56) References Cited

U.S. PATENT DOCUMENTS

2016/0282637 A1    9/2016   Ryan
2017/0176775 A1    6/2017   Mappes et al.

OTHER PUBLICATIONS

Written Opinion of the ISA for PCT/EP2019/065138 dated Sep. 3, 2019, 7 pages.

\* cited by examiner

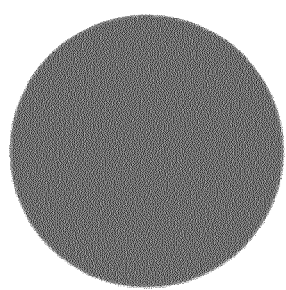
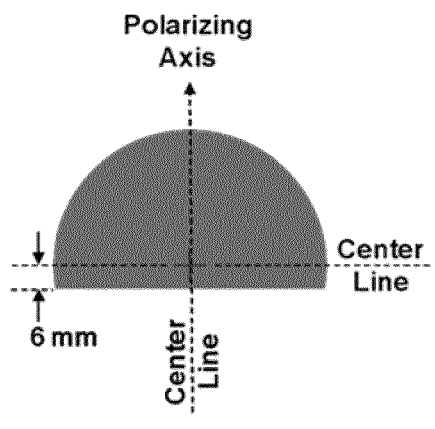
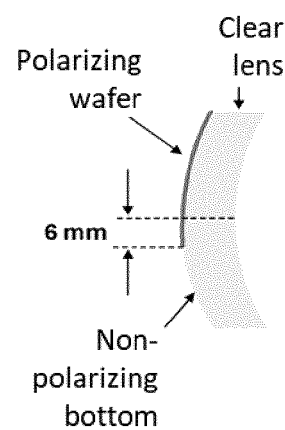
FIG. 2A  FIG. 2B  FIG. 2C
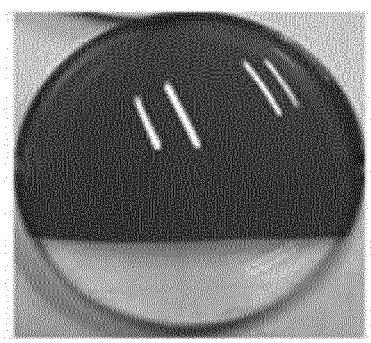
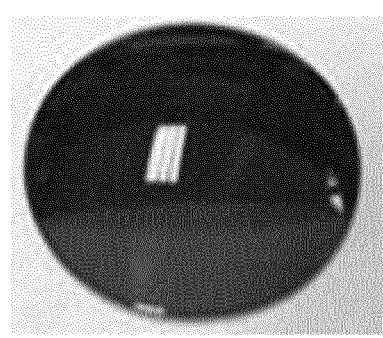
FIG. 3A  FIG. 3B

METHOD FOR MAKING A GRADIENT COLOR POLAR LENS WITH A NON-POLAR NEAR VISION ZONE

This application is the U.S. national phase of International Application No. PCT/EP2019/065138 filed Jun. 11, 2019 which designated the U.S. and claims priority to EP Patent Application No. 18305720.7 filed Jun. 12, 2018, the entire contents of each of which are hereby incorporated by reference.

FIELD OF INVENTION

The present invention concerns a method of preparing a sunglasses lens. More specifically, the present invention concerns a method of preparing a partially polarized sunglasses lens.

BACKGROUND OF THE INVENTION

Polarized lenses are generally used to reduce glare reflected at certain angles off subjects such as water, road, or other surfaces. Sunglasses with polarized lenses have become highly popular because they can improve wearers' safety in environments with bright lights by allowing wearers to look at glaring surfaces or objects that would otherwise be difficult to see.

However, polarized lenses are often too dark in changing lighting conditions, such as changing lighting from sunny outdoors environment to under the shade. This can negatively impact wearers' vision to spot close-by objects, such as stair steps or road bumps. Furthermore, polarized lenses also drastically reduce the visibility of some LCD or LED displays, which are used in cars, cell phones, computer screens, or other portable devices. To view these displays, polarized sunglasses wearers have to remove their glasses, causing inconvenience especially when the wearers are operating a vehicle. To overcome these issues, sunglasses lenses that include both polarizing zones and non-polarizing zones have been proposed. For instance, U.S. Pat. No. 9,372,353 and U.S. Publication No. 2015/0253465 disclose gradient-polarized lenses produced by gradient inkjet printing on an alignment layers and/or dichroic dye deposition. However, the use of an alignment layer and dichroic dye deposition are technically complicated and can significantly increase the production cost of the partially polarized lenses. U.S. Publication No. 2017/176775 discloses a polarized lens that includes a gradual polarization change from the top to the bottom of the lens without a clearly defined border of polarizing zone and non-polarizing zone. This can be problematic for wearers reading an LCD or LED display as they may not be able to tell whether they are looking through a polarizing zone or a non-polarizing area of the lens.

Overall, while partially polarized lenses and the methods of making the partially polarized lenses exist, the need for improvements in this field persists in light of at least the aforementioned drawbacks with the currently available partially polarized lenses and the methods of making them.

SUMMARY OF THE INVENTION

A solution to the above-mentioned problems associated with methods of preparing a partially polarized optical lens has been discovered. The solution resides in a method of preparing a partially polarized optical article including using a polarizing filter or polarizing coating to cover at least a portion of a front surface of the optical article to form a polarizing zone and a non-polarizing zone, and gradient tinting the optical article to reduce color difference between the polarizing zone and the non-polarizing zone. By way of example, the top two thirds of an optical lens can be covered by a polarizing filter and/or polarizing coating to form a clearly defined polarizing zone on the top portion of the lens and a clearly defined non-polarizing zone on the bottom third of the lens. Thus, this method is capable of producing partially polarizing lenses using a relatively simple process compared to inkjet printing on an alignment layer and/or dichroic dye deposition-based methods. Furthermore, the method of the present invention produces partially polarized lenses that have clearly defined polarizing zones and non-polarizing zones, thereby enabling the wearer to conveniently decide whether to look through the polarizing filter. Therefore, the methods of the present invention provide a technical achievement over at least some of the problems associated with the currently available methods of preparing partially polarized lenses.

Some embodiments of the present invention are directed to a method of preparing a partially polarized optical article. The method may comprise providing an optical substrate comprising a front surface and a back surface. The method may comprise covering a portion of the front surface with a polarizing element to form a polarizing zone and a non-polarizing zone. The method may comprise tinting the optical substrate to reduce color difference between the polarizing zone and the non-polarizing zone. In some embodiments, the method may further comprise depositing one or more additional coatings on the tinted optical substrate. In some instances, the additional coatings may comprise a mirror coating, an anti-reflective coating, an abrasion-resistant coating, a photochromic coating, an anti-smudge coating, an anti-fog coating, a tintable coating, a self-healing coating, an anti-rain coating, an anti-static coating, an anti-UV coating, an anti-blue light coating, an infra-red cut coating, a color enhancement coating, a light filter coating or combinations thereof.

In some aspects, the optical substrate may comprise polycarbonate, allyl diglycol carbonate, polyepisulfides, polyamide, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclic olefins, polyacrylonitriles, polyethylene terephtalates, polyetherimides, polypentenes, cellulose triacetate, or combinations thereof. In some aspects, the optical article may include an optical lens. In some aspects, the polarizing zone comprises a far vision zone of the optical lens and the non-polarizing zone comprises a near vision zone of the optical lens. In some instances, the near vision zone comprises about the bottom third area of the optical lens.

In some aspects, the covering step may comprise coating, casting, and/or injection molding. In some embodiments, the polarizing element may include at least a portion of a polarizing wafer. In some aspects, the polarizing wafer may be prepared by forming a single layered or multi-layered flat polarizing filter comprising at least one polyvinyl alcohol polarizing layer and optional protective or functional layers into a curve-shaped wafer. In some embodiments, the polarizing element may comprise a polarizing coating deposited on the front surface of the optical substrate. In some aspects, the tinting step may comprise a dip tint process, a sublimation dye transfer process, an ink jet printing process, or combinations thereof. In some instances, the tinting step may comprise gradient-tinting only the non-polarizing zone of the optical lens to produce a gradual color transition from the polarizing zone to the non-polarizing zone. In some instances, the tinting step may comprise gradient-tinting both the non-polarizing zone and the polarizing zone to produce a gradual color transition from the polarizing zone to the non-polarizing zone. In some aspects, the tint used in the tinting step may comprise a fixed tint, a photochromic tint, or combinations thereof.

Some embodiments of the invention are directed to a method of preparing a partially polarized sunglasses lens. The method may comprise providing a lens substrate comprising a front surface and a back surface. The method may comprise covering a portion of the front surface of the lens substrate with a polarizing element to form a polarizing zone that covers a far vision zone of the lens substrate and a non-polarizing zone that covers the near vision zone. The method may comprise gradient-tinting the lens substrate to reduce color difference and/or produce a gradual color transition between the polarizing zone and the non-polarizing zone.

Some embodiments of the invention are directed to a partially polarized sunglasses lens. The partially polarized sunglasses lens may comprise a lens substrate comprising a front surface and a back surface. The partially polarized sunglasses lens may comprise at least a portion of a polarizing element covering at least a portion of the front surface of the lens substrate, defining a polarizing zone and a non-polarizing zone of the sunglasses lens. The partially polarized optical lens may comprises a gradient-tint layer covering the non-polarizing zone and/or polarizing zone adapted to produce a gradual color transition between the polar zone and the non-polar zone. In some aspects, the polarizing zone covers a far vision zone of the lens substrate, and the non-polar zone covers a near vision zone of the lens substrate.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "partially polarized," as that term is used in the specification and/or claims, means only part of the whole optical article, optical lens, or equivalent thereof is polarized. The "partially polarized optical article, optical lens, or equivalent thereof" includes about 10% to about 90% polarized surface area.

As used herein, the phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification. With respect to the phrase "consisting essentially of," a basic and novel property of the apparatus and methods of the present invention is to produce a tinted partially polarized optical article that has a polarizing zone and a non-polarizing zone.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

For a more complete understanding, reference is now made to the following descriptions taken in conjunction with the accompanying drawings, in which:

FIGS. 2A-2C show schematic diagram of a round polarizing wafer (FIG. 2A), a truncated polarizing wafer (FIG. 2B), a truncated polarizing wafer covering a portion of the front surface of a lens (FIG. 2C), according to embodiments of the invention;

FIGS. 3A and 3B show a partially polarized lens produced using a casting process before the tinting step (FIG. 3A) and after the tinting step (FIG. 3B), according to embodiments of the invention.

DETAILED DESCRIPTION OF THE INVENTION

The currently available methods for preparing partially polarized optical articles suffer the deficiencies including complicated processes to incorporate the polarizing elements and an ambiguous border between the polarizing zone and the non-polarizing zone of the lens. The present invention provides a solution to these problems. The solution is premised on a method of preparing a partially polarized optical article that comprises directly covering a portion of an optical substrate with a polarizing element to form a polarizing zone and a non-polarizing zone, and tinting the optical lens to produce a gradual color transition between the polarizing zone and the non-polarizing zone. The produced optical article, such as a sunglasses lens, has clearly defined polarizing zone and non-polarizing zone. Additionally, the method further includes gradient-tinting the partially polarized optical article to reduce the color different between the polarizing zone and the non-polarizing zone, thereby improving the appearance of the partially polarized optical article.

These and other non-limiting aspects of the present invention are discussed in further detail in the following sections.

A. Method of Preparing Partially Polarized Optical Article

Polarized lenses are used to reduce the glare of objects and improve visibility of glaring surfaces in bright environments. However, these lenses can be too dark in changing lighting conditions or when the wearers are reading LCD or LED displays. Conventionally, partially polarized or gradient-polarized lenses can be produced using complicated processes including gradient inkjet printing on an alignment layers and/or dichroic dye deposition. Furthermore, the produced partially or gradient-polarized lenses often do not have a clear border of a polarizing zone and a non-polarizing zone, resulting in it being inconvenient for the wearers of the lenses to decide whether they are looking through a polarizing zone or non-polarizing zone of the lenses.

Figure 1:
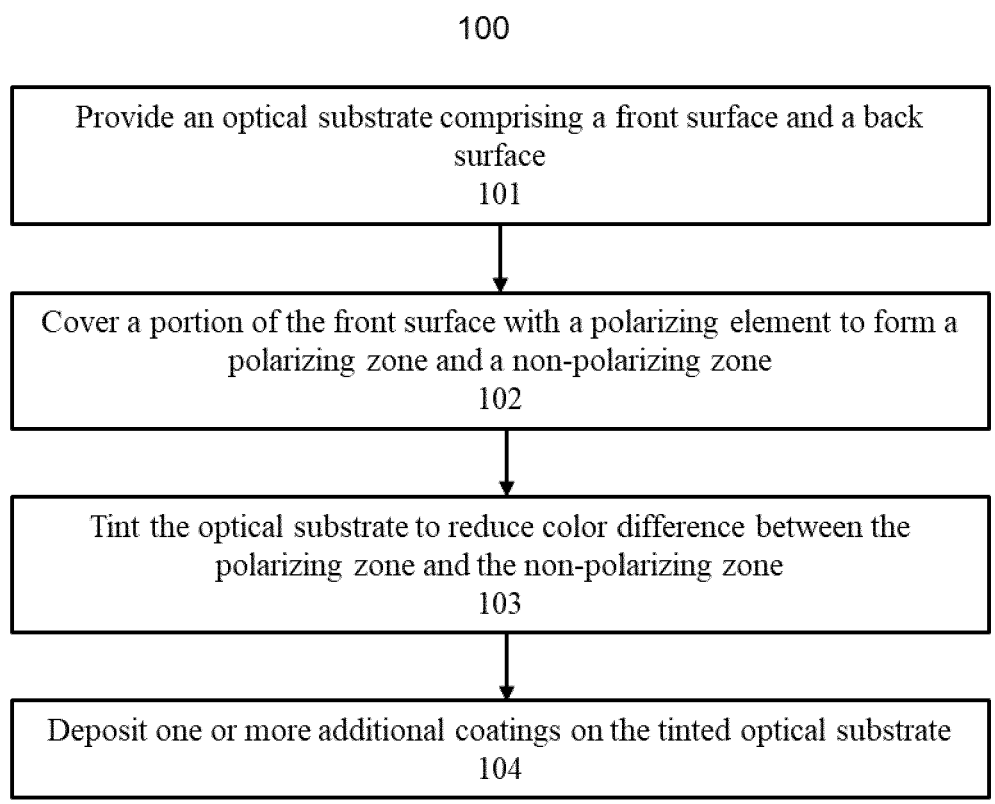
FIG. 1 shows a schematic flowchart for a method of preparing a partially polarized optical article, according to embodiments of the invention.

The method of the present invention is capable of using simple processes to produce a partially polarized lens with a clear border of a polarizing zone and a non-polarizing zone. As shown in FIG. 1, embodiments of the present invention include method 100 of preparing a partially polarized optical article. In some aspects, the optical article may include an optical lens. In some instances, the optical lens may include a sunglasses lens.

In embodiments of the invention, as shown in block 101, method 100 may comprise providing an optical substrate comprising a front surface and a back surface. In some aspects, the optical substrate may be a lens substrate. In some aspects, the optical substrate may comprise polycarbonate, allyl diglycol carbonate, polyepisulfides, polyamide, trivex, polyacrylics, polyols, polyamines, polyanhydrides, polycarboxilic acids, polyepoxides, polyisocyanates, polynorbomenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclic olefins, polyacrylonitriles, polyethylene terephtalates, polyetherimides, polypentenes, cellulose triacetate, or combinations thereof. In some aspects, the optical substrate is a substrate for an ophthalmic lens. The front surface of the optical substrate may comprise a convex surface of the ophthalmic lens. The back surface of the optical substrate may comprise a concave surface of the ophthalmic lens.

In some embodiments, as shown in block 102, method 100 may comprise covering a portion of the front surface with a polarizing element to form a polarizing zone and a non-polarizing zone of the substrate. The covering at block 102, may include coating, casting, injection molding, or combinations thereof. In some instances, the coating process may include, photoalignment coating, brush-alignment coating, or combinations thereof. In some instances, the casting process may include in mold casting, overmold casting or combinations thereof. In some instances, the injection molding may include wafer insert molding, in-mold lamination, or combinations thereof.

In some embodiments, the polarizing element may include a portion or a whole polarizing wafer. In some aspects, the polarizing wafer may be prepared by forming a polarizing filter that comprises at least one polyvinyl alcohol polarizing layer, polyacetylene polarizing layer, polyene polarizing layer, polyvinylene polarizing layer, polyethylene terephthalate (PET) polarizing layer, reflective polarizing layer, or wire-grid polarizing layer into a curve-shaped wafer. In some aspects, the forming may include a thermoforming process. In some aspects, the thermoforming process may include free-edge vacuum forming, plug-assist vacuum or pressure forming, match-mold press forming, blow forming, or combinations thereof. The polarizing filter may have a single layered structure or a multi-layered structure. In some instances, the polarizing filter may include one or more protective or functional layers. Non-limiting examples of the protective layer may include polycarbonate (PC) protective layer, cellulose acetate (CA), cellulos acetate butyrate (CAB), cellulose triacetate (TAC), polymethyl methacrylate (PMMA), polyamide (PA), PET, cyclic olefin copolymer (COC), cyclic olefin polymer (COP), or combinations thereof. Non-limiting examples of the functional layer may include photochromic layer, blue cut layer, UV cut layer, IR cut layer, color enhancement layer, tintable layer, mirror layer or combinations thereof. In some aspects, the polarizing filter may include a high transmission filter. In some instances, the light transmission of the polarizing filter may be greater than 10%, preferably 15% to 50% and all ranges and values there between. The polarizing filter may have a thickness in a ranges of 10 to 1000 µm and all ranges and values there between. In some aspects, as shown in FIGS. 2A-2C, the polarizing wafer may be truncated to cover a portion of the front surface of the optical article. In some embodiments, the polarizing element may include a polarizing coating deposited on at least a portion of the front surface of the optical substrate. In some instances, the polarizing coating may include photoalignment coating brush-alignment coating. In some aspects, the polarizing coating may have a thickness in a ranges of 1 to 40 µm and all ranges and values there between.

In some embodiments, the polarizing zone may comprise a far vision zone of the optical lens and the non-polarizing zone may comprise a near vision zone of the optical lens. In some aspects, the near vision zone may include a bottom 10 to 50% area of the optical lens and all ranges and values there between. In some instances, the near vision zone comprises about the bottom third of the optical lens. In some instances, a borderline between the polarizing zone and the non-polarizing zone may be substantially a straight line. The borderline may be about 0 mm to 15 mm below a center line (vertical center) of the optical lens.

In embodiments of the invention, as shown in block 103, method 100 may comprise tinting the optical substrate to reduce color difference between the polarizing zone and the non-polarizing zone. In some aspects, the tinting at block 103 may include a dip tint process, a sublimation dye transfer process, an ink jet printing process, or combinations thereof. In some instances, the dip tint process may include a tinting temperature in a range of 40 to 99° C. and all ranges and values there between. In some aspects, in tinting step at block 103, tint may be introduced into a tintable coating, or a tintable film disposed on the front surface of the optical substrate. In some aspects, at block 103, tint may be introduced directly to the front surface of the optical substrate.

In some aspects, the tinting at block 103 may comprise gradient-tinting both the non-polarizing zone and the polarizing zone to produce a gradual color transition from the polarizing zone to the non-polarizing zone. In some instances, the tinting may provide a gradient-tint that starts at a top of the polarizing zone with about 15% transmission and gradually increases to about 75% transmission at the bottom of the non-polarizing zone. In some aspects, the tinting at block 103 may comprise gradient-tinting only the non-polarizing zone to produce a gradual color transition from the polarizing zone to the non-polarizing zone. In some aspects, the tint used in the tinting step at block 103 may comprise a fixed tint, a photochromic tint, or combinations thereof. In embodiments of the invention, as shown in block 104, method 100 may further include depositing one or more additional coatings on the tinted optical substrate. Non-limiting examples of the additional coatings may include a mirror coating, an anti-reflective coating, an abrasion-resistant coating, a photochromic coating, an anti-smudge coating, an anti-fog coating, a tintable coating, a self-healing coating, an anti-rain coating, an anti-static coating, an anti-UV coating, an anti-blue light coating, or combinations thereof.

B. Partially Polarized Sunglasses Lens

Embodiments of the invention include a partially polarized sunglasses lens. In some embodiments, the partially polarized sunglasses lens may be prepared by method 100 as described above. In embodiments of the invention, the partially polarized sunglasses lens may include a lens substrate comprising a front surface and a back surface. In some aspects, the lens substrate may include polycarbonate, allyl diglycol carbonate, polyepisulfides, polyamide, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclic olefins, polyacrylonitriles, polyethylene terephtalates, polyetherimides, polypentenes, cellulose triacetate, or combinations thereof. In some aspects, the front surface of the lens substrate may include a convex surface. The back surface of the lens substrate may include a concave surface.

In embodiments of the invention, the partially polarized sunglasses lens may include at least a portion of a polarizing element in a covering relationship with a portion of the front surface of the lens substrate, defining a polarizing zone and a non-polarizing zone of the sunglasses lens. In some aspects, the polarizing zone includes a far vision zone of the lens substrate, and the non-polarizing zone includes a near vision zone of the lens substrate.

In some aspects, the polarizing element may include a portion of or a whole polarizing wafer, a polarizing coating, and combinations thereof. In some embodiments, the polarizing wafer may be prepared by forming a polarizing filter into a curve-shaped wafer. The polarizing filter may have a single layered structure or a multi-layered structure. In some aspects, the polarizing filter may comprise at least one polyvinyl alcohol polarizing layer, polyacetylene polarizing layer, polyene polarizing layer, polyvinylene polarizing layer, polyethylene terephthalate (PET) polarizing layer, reflective polarizing layer, or wire-grid polarizing layer. In some instances, the polarizing filter may further include one or more protective layers and/or functional layers. Non-limiting examples of the protective layer may include PC, CA, CAB, TAC, PMMA, PA, PET, COC, COP, or combinations thereof. Non-limiting examples of the functional layer may include photochromic layer, blue cut layer, UV cut layer, IR cut layer, color enhancement layer, tintable layer, mirror layer, or combinations thereof In some aspects, the polarizing wafer may have a curved shape that conforms to the front surface of the lens substrate. In some embodiments, the polarizing wafer may have a thickness of 10 to 1000 μm and all ranges and values there between. In some embodiments, the polarizing coating may include photo alignment coating, brush-alignment coating, or combinations thereof. The polarizing coating may have a thickness of 1 to 40 μm and all ranges and values there between.

In some instances, the polarizing wafer may have a transmission of 10% to 50% and all ranges and values there between. In some instances, the polarizing coating may have a transmission of 10% to 50% and all ranges and values there between.

In embodiments of the invention, the partially polarized sunglasses lens may further comprise a tint layer in a covering relationship with the non-polarizing zone and/or polarizing zone forming gradual color transition between the polarizing zone and the non-polarizing zone. In some aspects, the tint layer may be a gradient tint layer. In some instances, the tint layer may have a light transmission of about 15% at the top of the polarizing zone and the light transmission may gradually increase to about 75% transmission at the bottom of the non-polarizing zone. In some instances, the tint layer may only cover the non-polarizing zone. In some aspects, the tint may include a fixed tint, a photochromic tint, or combinations. In some aspects, the tint may be on a tintable coating or a tintable film disposed on the front surface of the lens substrate. Alternatively or additionally, the tint may be directly on the front surface of the lens substrate.

In embodiments of the invention, the partially polarized sunglasses lens may further comprise one or more additional coatings in a covering relationship with the tint layer and/or the polarizing element. Non-limiting examples of the one or more additional coatings may include a mirror coating, an anti-reflective coating, an abrasion-resistant coating, a photochromic coating, an anti-smudge coating, an anti-fog coating, a tintable coating, a self-healing coating, an anti-rain coating, an anti-static coating, an anti-UV, an anti-blue light coating, or combinations thereof.

Although embodiments of the present invention have been described with reference to blocks of FIG. 1, it should be appreciated that operation of the present invention is not limited to the particular blocks and/or the particular order of the blocks illustrated in FIG. 1. Accordingly, embodiments of the invention may provide functionality as described herein using various blocks in a sequence different than that of FIG. 1.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Preparation of Partially Polarized Lens by Casting

An allyl diglycol carbonate lens (Columbia Resin #39) having a non-polarizing zone in the near vision zone was prepared by casting. A commercial polyvinyl alcohol polarizing filter with transmission of about 40% was die-cut and thermoformed into a 6-base round wafer having a 88.3 mm front radius and a 80 mm diameter. The polarizing wafer was truncated to remove a bottom portion thereof. The truncated polarizing wafer was then placed into a glass mold assembly for casting using allyl diglycol carbonate monomer. The casted lens was then cured to obtain a partially polarized lens with a clear non-polarizing near vision zone, as shown in FIG. 3A.

The casted lens was then gradient-tinted with a dip tint process using a tint bath at a tinting temperature of 90° C. to produce darker tint in the polarizing zone and lighter tint in the non-polarizing zone. The obtained tinted partially polarized lens is shown in FIG. 3B. The wearer of the sunglasses with the tinted partially polarized lens can consciously choose to look through the polarizing far vision zone or the non-polarizing near vision zone of the lenses.

Example 2

Preparation of Partially Polarized Lens by Injection Molding

Figure 4:
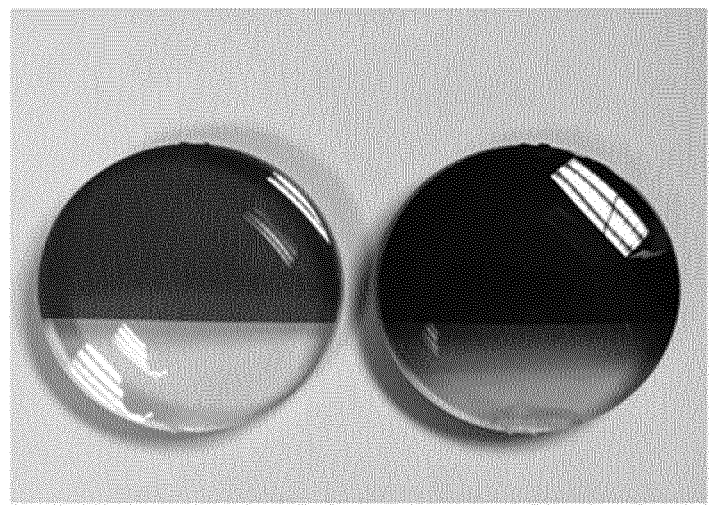
FIG. 4 shows a partially polarized lens produced using an injection molding process before the tinting step (left) and after the tinting step (right), according to embodiments of the invention.

A 4.25 base round polarizing wafer with about 15% transmission was prepared and truncated according to the same process in Example 1. The truncated polarizing wafer was then used in a standard polycarbonate polarizing lens injection molding process to produce a 4.25 B partially polarized semi-finished single vision polycarbonate lens with a clear non-polarizing near vision zone at the bottom portion (as shown in the left figure of FIG. 4). The partially polarized semi-finished single vision polycarbonate lens was further tinted to blend-in the borderline between polarizing zone and non-polarizing zone and produce a smooth gradient color for the lens, as shown in FIG. 4 (right figure of FIG. 4).

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, treatment, machine, manufacture, composition of matter, means, methods, and/or steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of preparing a partially polarized sunglasses lens, the method comprising:
   providing a lens substrate comprising a front surface and a back surface;
   covering a portion of the front surface of the lens substrate with a polarizing element to form a polarizing zone that covers a far vision zone of the lens substrate and a non-polarizing zone that covers the near vision zone of the lens substrate, said near vision zone includes a bottom 10 to 50% area of the optical lens; and
   gradient-tinting the lens substrate to reduce color difference and/or produce a gradual color transition between the polarizing zone and the non-polarizing zone.

2. The method of claim 1, further comprising depositing one or more additional coatings on the tinted lens substrate, wherein the additional coatings comprise a mirror coating, an anti-reflective coating, an abrasion-resistant coating, a photochromic coating, an anti-smudge coating, an anti-fog coating, a tintable coating, a self-healing coating, an anti-rain coating, an anti-static coating, an anti-UV coating, an anti-blue light coating, or combinations thereof.

3. The method of claim 1, wherein the lens substrate comprises polycarbonate, allyl diglycol carbonate, polyepisulfides, polyamide, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclic olefins, polyacrylonitriles, polyethylene terephtalates, polyetherimides, polypentenes, cellulose triacetate, or combinations thereof.

4. The method of claim 1, wherein the near vision zone comprises about bottom third of the optical lens.

5. The method of claim 1, wherein the covering step comprises coating, casting, and/or injection molding.

6. The method of claim 1, wherein the polarizing element comprises at least a portion of a polarizing wafer and/or a polarizing coating, wherein the polarizing wafer is prepared by forming a single or multi-layer flat polarizing filter comprising at least one polyvinyl alcohol polarizing layer and optional protective and/or functional layers into a curve-shaped wafer.

7. The method of claim 1, wherein the tinting includes a dip tint process, a sublimation dye transfer process, an ink jet printing process, or combinations thereof.

8. The method of claim 1, wherein the tinting comprises gradient-tinting only the non-polarizing zone to produce a gradual color transition from the polarizing zone to the non-polarizing zone.

9. The method of claim 1, wherein the tinting comprises gradient-tinting both the non-polarizing zone and the polarizing zone to produce a gradual color transition from the polarizing zone to the non-polarizing zone.

10. The method of claim 1, wherein the tint used in the tinting step comprises a fixed tint, a photochromic tint, or combinations thereof.

11. A partially polarized sunglasses lens comprising:
    a lens substrate comprising a front surface and a back surface;
    at least a portion of a polarizing element covering a portion of the front surface of the lens substrate, defining a polarizing zone that covers a far vision zone of the lens substrate and a non-polarizing zone that covers the near vision zone of the lens substrate, of the sunglasses lens, said near vision zone includes a bottom 10 to 50% area of the optical lens;
    a gradient-tint layer covering the non-polarizing zone and/or polarizing zone with gradual color transition between the polar zone and the non-polar zone.

12. The partially polarized sunglasses lens of claim 11, wherein the near vision zone comprises about bottom third of the optical lens.

\* \* \* \* \*